2,978,405
OXIDATIVE SWEETENING WITH ALKALINE MATERIAL AND IMIDAZOLE DERIVATIVE

Rolland G. Bowers, Perrysburg, Ohio, assignor to Sun Oil Company, Philadelphia, Pa., a corporation of New Jersey No Drawing. Filed June 18, 1959, Ser. No. 821,098

7 Claims. (Cl. 208—206)

This invention relates to sweetening sour hydrocarbon distillates, and more particularly to a manner of providing increased sweetening rate.

According to the present invention, a novel manner is provided of obtaining more rapid sweeting. This result is obtained by carrying out the sweetening operation in the presence of an imidazole having in the molecule a radical containing at least 12 carbon atoms.

The imidazoles which can be used include imidazolines and benzimidazoles. They can be prepared by known reactions of carboxylic acids with polyamines. For example, reaction of carboxylic acid with phenylene diamine and its derivatives gives substituted benzimidazoles where the substituent in the two position is the radical which was initially attached to the carboxyl group in the acid. Reaction of carboxylic acid with acyclic polyamines, e.g. ethylene diamine and its derivatives, gives substiituted imidazolines. Again, the substituent in the 2-position is the radical initially attached to the carboxyl in the acid, and the carbon atom of the carboxyl becomes a member of the imidazole ring, being attached by a double bond to one nitrogen atom of the original polyamine, and by a single bond to another nitrogen atom of the polyamine. Various derivatives of ethylene diamine, e.g. diethylene triamine, N-hydroxyethyl ethylene diamine, etc., give imidazolines variously substituted in the 1-position, e.g. by aminoethyl and hydroxyethyl radicals respectively in the case of these derivatives.

Quaternary salts of the imidazoles are beneficially employed according to the invention. These may be obtained by suitable known methods, e.g. the reaction of the free base with a halohydrocarbon, e.g. benzyl chloride, hexadecyl chloride, methyl bromide, etc., or with a sulfated hydrocarbon, e.g. ethyl sulfate, etc. Other known methods can be employed.

Preferred imidazoles for use according to the invention are those having the formula:

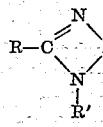

where R is a hydrocarbon radical containing 12 to 30 carbon atoms, R' is selected from the group consisting of hydrogen, hydrocarbon radicals, hydroxyaliphatic radicals, acylhydroxyaliphatic radicals (obtainable by esterification of the hydroxyaliphatic radicals with carboxylic acids), amino-aliphatic radicals, and acylaminoaliphatic radicals (obtainable by amidification of the aminoaliphatic radicals with carboxylic acids), R' having molecular weight not greater than 300, and X is selected from the group consisting of alkylene and phenylene radicals.

More preferred imidazoles for use according to the invention are the quaternary salts having the formula:

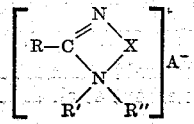

where R, R', and X are as defined above, and where R" is selected from the group consisting of hydrocarbon radicals and halohydrocarbon radicals having 1 to 30 carbon atoms, and A is an anion selected from the group consisting of halide and sulfate ion.

Examples of suitable imidazoles are the following: 2-heptadecenyl imidazoline; 2-abietyl-1-ethyl-3,4-dimethyl imidazoline; 2-naphthenyl - 1 - hydroxyethyl imidazoline and the acetyl derivatives thereof; 2-heptadecadienyl-1-aminoethyl imidazoline and the lauroyl derivative thereof; 2-undecyl benzimidazole; quaternary salts of the above with benzyl chloride, hexadecyl chloride, methyl bromide, ethyl sulfate; etc.

The amount of imidazole in the sweetening mixture according to the invention is preferably in the range from 0.001 to 1.0 weight percent based on hydrocarbon charge stock. Smaller amounts can be used in some cases, though generally with decreased effectiveness. Greater amounts can be used, and quite effectively, but are usually avoided because unnecessary for satisfactory results.

The known phenylene diamine compounds for use in inhibitor sweetening are generally suitable for use according to one embodiment of the invention. The most commonly used compound is N,N'-di-secondary-butyl-p-phenylene diamine. Other suitable phenylene diamine compounds include N,N'-di-isopropyl - p - phenylene diamine, N,N'-di-secondary-amyl-p-phenylene diamine, N-isopropyl-N'-secondary-butyl-p-phenylene diamine, N-isopropyl-N'-secondary-amyl-p-phenylene diamine, N - secondary-butyl-N'-secondary-amyl - p - phenylene diamine, etc. The amount of phenylene diamine compound employed is generally within the approximate range from 0.0001 to 1.0 weight percent based on hydrocarbons, more preferably, 0.001 to 0.1 weight percent. However, any amount known to be suitable for inhibitor sweetening can be used.

The alkaline material in the sweetening mixture is an aqueous solution of alkali, e.g. alkali metal or ammonium hydroxide or carbonate. Typically, the alkaline material is a 5 to 20 weight percent solution though other concentrations can be used. The amount of alkaline material is preferably in the range from 0.01 to 5 weight percent though any amount known to be suitable for use in oxidative sweetening can be used.

The temperature conditions of the sweetening operation according to the invention can be those which are employed in the conventional sweetening operations. Preferably, relatively low temperatures, e.g. in the range from 50° F. to 125° F., are employed in order to favor the dispersion of the alkaline material in the hydrocarbons. However, higher temperatures can be employed if desired.

Agitation of the sweetening mixture promotes the conversion of mercaptans. Agitation can be provided only at the beginning of the sweetening operation, or irregularly during the operation, or it can be provided periodically or continuously during the operation. In some cases at least, the presence of the imidazole according to the invention reduces the extent of the agitation needed to provide satisfactory sweetening rate.

Molecular oxygen is required for the sweetening operation. Frequently, petroleum distillates normally contain sufficient dissolved oxygen to obtain substantial sweetening. Additional oxygen can be supplied, regularly or irregularly, if needed.

The process according to the invention is applicable generally to those mercaptan-containing petroleum fractions, such as gasoline, naphtha, kerosene and fuel oil fractions, which are known to be susceptible to oxidative sweetening with aqueous alkali. A typical charge stock is a 62° API, 400° F. endpoint, catalytically cracked and caustic-pretreated gasoline containing about 0.01 weight percent mercaptan sulfur, but the applicability of the invention to other known charge stocks for inhibitor sweetening and other oxidative sweetening processes with alkali will be readily apparent.

The following examples illustrate the invention:

Example 1

A mixture of equal parts of sour gasoline and furnace oil, the mixture containing 0.0059 wt. percent of mercaptan sulfur, is contacted at room temperature with 2.5 volume percent of 20° Baumé caustic soda based on the hydrocarbon mixture, with 5 pounds of N,N'-di-secondary butyl phenylene diamine per 1000 barrels of hydrocarbon mixture, and with 10 pounds of an imidazolinium chloride composition per 1000 barrels of hydrocarbon mixture.

The imidazolinium chloride used is a mixture of two compounds having the following formula:

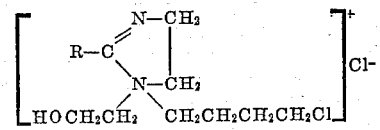

where R is n-heptadecenyl in one of the compounds and n-heptadecadienyl in the other. The composition employed as additive here contains 60% of the imidazolinium chlorides and 40% isopropanol, and has specific gravity at 60° F. of 0.960 and pour point less than minus 36° F.

The hydrocarbon mixture, caustic soda, diamine and quaternary imidazole salt are shaken together for one hour, then allowed to stand for 5 hours. Sufficient dissolved oxygen is present to oxidize mercaptans and reduce the mercaptan sulfur content to 0.0045 wt. percent at 5 hours after first contact. At 6 hours after first contact, 100 cc. of air per 400 cc. of hydrocarbon mixture are injected, and the sweetening mixture shaken for 15 minutes, then allowed to stand for the rest of the experiment. At 64 hours after first contact, the mercaptan sulfur content is 0.0017 wt. percent.

To determine the effect of the quaternary imidazole salt, an identical experiment is performed in which the salt is omitted. The following table shows the result:

| Time in Hours | Mercaptan Sulfur Content | |
|---|---|---|
| | Imidazolinium Chloride Present | Imidazolinium Chloride Absent |
| 5 | 0.0045 | 0.0050 |
| 64 | 0.0017 | 0.0031 |

These results show the increase in sweetening rate obtained with the imidazolinium chloride.

Example 2

The procedure of Example 1 is repeated, with imidazolinium chloride present, omitting however the injection of additional air and the additional shaking after 6 hours. In one experiment, fresh caustic soda is used, as in Example 1, and in another experiment, caustic soda is used which has previously been employed to refine cracked gasoline and contains cresylates extracted from the gasoline in the refining operation. The following table shows the results:

| Time in Hours | Fresh Caustic | Used Caustic |
|---|---|---|
| 22 | 0.0040 | 0.0033 |
| 64 | 0.0033 | 0.0024 |

These results show particularly good cooperation between the imidazolinium chloride, the used caustic, and the phenylene diamine agent.

In the absence of the phenylene diamine, used caustic containing cresylates is apparently relatively ineffective. A mercaptan sulfur content of 0.0043 wt. percent at 64 hours is obtained with imidazolinium chloride present, as compared with 0.0036% for fresh caustic.

Example 3

The procedure of example 2 is repeated, using fresh 20° Baumé caustic, but omitting the phenylene diamine agent. In one experiment, the imidazolinium chloride is present, in the other it is absent. The following table shows the results:

| Time in Hours | Mercaptan Sulfur Content | |
|---|---|---|
| | Imidazolinium Chloride Present | Imidazolinium Chloride Absent |
| 22 | 0.0041 | 0.0049 |
| 64 | 0.0036 | 0.0049 |

These results show that the imidazolinium chloride accelerates oxidative sweetening with caustic in the absence of a phenylene diamine inhibitor.

Generally similar results to those obtained in the preceding examples are obtained using other imidazoles, phenylene diamine agents and alkaline materials such as those disclosed previously.

The invention claimed is:

1. Process for reducing the mercaptan content of hydrocarbons which comprises contacting hydrocarbons containing mercaptans with treating materials consisting essentially of aqueous alkali, oxygen and an imidazole having a radical containing at least 12 carbon atoms.

2. Process for reducing the mercaptan content of hydrocarbons which comprises contacting hydrocarbons containing mercaptans with treating materials consisting essentially of aqueous alkali, oxygen, a phenylene diamine sweetening agent and an imidazole having a radical containing at least 12 carbon atoms.

3. Process according to claim 2 wherein the aqueous alkali is present in concentration of about 2.5 volume percent based on hydrocarbons.

4. Process according to claim 2 wherein the imidazole is a quaternary imidazolinium salt.

5. Process according to claim 4 wherein the imidazole has the formula

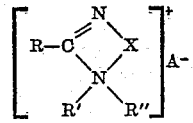

where R is a hydrocarbon radical containing 12 to 30 carbon atoms, R' is selected from the group consisting of hydrogen, hydrocarbon radicals, hydroxyaliphatic radicals, acylhydroxyaliphatic radicals, aminoaliphatic radicals, and acylaminoaliphatic radicals, and having molecular weight not greater than 300, R'' is selected from the group consisting of halohydrocarbon and hydrocarbon radicals having 1 to 30 carbon atoms, X is selected from the group consisting of arylene and alkylene radicals, and A is an anion selected from the group consisting of halide and sulfate ion.

6. Process according to claim 5 wherein R' is hydroxyethyl, R'' is a chlorobutyl radical, and A is chloride.

7. Process according to claim 5 wherein R' is hydroxyethyl, R'' is benzyl, and A is chloride.

References Cited in the file of this patent

UNITED STATES PATENTS

| 2,616,831 | Rosenwald | Nov. 4, 1952 |
| 2,674,566 | Oosterhout et al. | Aug. 6, 1954 |